A. H. BOGARDUS.
SPHERICAL GLASS TARGETS.
No. 189,422. Patented April 10, 1877.
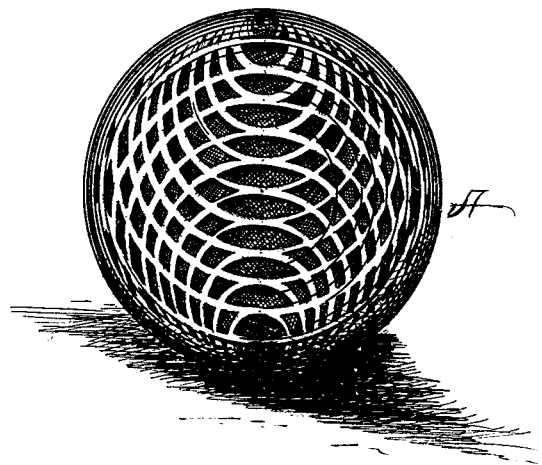
WITNESSES
Franck L. Ourand
H. N. Miller
INVENTOR
Adam H. Bogardus
Alexander Mason
ATTORNEYS.

UNITED STATES PATENT OFFICE.

ADAM H. BOGARDUS, OF ELKHART, ILLINOIS.

IMPROVEMENT IN SPHERICAL GLASS TARGETS.

Specification forming part of Letters Patent No. 189,422, dated April 10, 1877; application filed March 26, 1877.

*To all whom it may concern:*

Be it known that I, ADAM H. BOGARDUS, of Elkhart, in the county of Logan, and in the State of Illinois, have invented certain new and useful Improvements in Glass Balls; and do hereby declare that the following is a full, clear, and exact description thereof, reference being had to the accompanying drawings, and to the letters of reference marked thereon, making a part of this specification.

The nature of my invention consists in the construction of a glass ball, with serrated or roughened surface for shooting purposes, as will be hereinafter set forth.

To enable those skilled in the art to make and use my invention, I will proceed to describe its construction and operation.

In the accompanying drawing, making a part of this specification, A represents a glass ball, which is made hollow, and which has its exterior surface roughened or serrated. The balls are about two and a half inches in diameter.

These balls are intended to be thrown from a trap for the purpose of practice-shooting with shot-guns, and are made sufficiently thin that they can be broken by the shot when struck.

As small shot are liable to glance from the sides of a smooth ball, I have serrated or roughened the outer surface to prevent this, and thus enable the shot to break the ball whenever it is struck.

I do not confine myself to any particular style of corrugations or serrations.

Having thus fully described my invention, what I claim is—

A hollow glass ball, having a serrated or roughened surface or exterior, as and for the purpose specified.

In testimony that I claim the foregoing I have hereunto set my hand this 19th day of March, 1877.

A. H. BOGARDUS.

Witnesses:
CHARLES D. METZ,
ALEX. F. BLINN.